United States Patent Office

3,108,144
Patented Oct. 22, 1963

3,108,144
CONVERSION OF CYCLOHEXANE TO CYCLOHEXENE
Ralph C. Tallman, El Dorado, Ark., assignor to Monsanto Chemical Company, St. Louis, Mo., a corporation of Delaware
No Drawing. Filed May 23, 1960, Ser. No. 30,771
4 Claims. (Cl. 260—666)

The present invention relates to the preparation of cyclohexene. More particularly, it relates to the preparation of cyclohexene by the catalytic reaction of oxygen and hydrogen chloride with cyclohexane.

Cyclohexene is a valuable starting material for the production of a wide variety of useful chemical derivatives. It is particularly in demand commercially as a precursor in the manufacture of adipic acid which is important in the synthesis of polyamides such as nylon and to produce caprolactam, another material coming into wide use in the synthetic fiber field. However, cyclohexene does not occur in any substantial quantities in commercially available raw materials and present processes for producing it are economically unattractive or, in general, are not commercially feasible. Since large amounts of cyclohexane are available from petroleum sources, attempts have been made to dehydrogenate this cycloalkane to produce cyclohexene. In most of the processes developed, however, employing a single conversion step, only a very small proportion, e.g., about 5% can be easily and directly converted to the desired olefin. In the known catalytic processes for convertion of cyclohexane to the corresponding unsaturated cyclic hydrocarbon, the predominant product of dehydrogenation is benzene which occurs in proportions that are several times or more as large as the amount of cycloolefin at any reasonable level of conversion per pass.

Another method for preparing cyclohexene involves dehydrohalogenation of a halocyclohexane particularly a monohalo compound. Whether this is done in the vapor or liquid phase, the overall process is a multistage one involving separate operations for halogenating the cyclohexane and for dehydrohalogenating the product which means that different apparatus and this is usually complex because of the necessity for temperature regulation, different reaction conditions, different catalysts, etc., are required in the various steps. Thus, the advantages of a process wherein cyclohexane can be converted directly to cyclohexene in a single operation in high yields are immediately obvious.

It is an object of the present invention to provide an improved process for the production of cyclohexene from cyclohexane in a one-step reaction with high yields of cyclohexene and comparatively little loss to non-useful by-products. Other objects and advantages of the invention will become apparent from the following description thereof.

According to the invention, a mixture of cyclohexane, hydrogen chloride, and oxygen is contacted at an elevated temperature with a rare earth chloride such as cerium chloride supported upon pumice to produce an effluent gas mixture from which cyclohexene can be readily recovered in excellent yield.

The invention is illustrated in the following example which, however, is not to be construed as limiting it in any manner whatsoever.

*Example 1*

A tubular glass reactor about 4 ft. long and 40 mm. in diameter wrapped with Nichrome wire for heating and covered with asbestos insulation was employed as the reactor. A thermowell containing a thermocouple for measuring temperatures was centrally positioned in the reactor extending throughout its length. The catalyst consisting of cerium chloride supported upon pumice was charged to the reactor and fluidized by passing nitrogen up through it while the reactor was brought up to reaction temperature. Cyclohexane, hydrogen chloride, and air were passed through a horizontal tube packed with glass helices and maintained at a temperature of about 100° C. to vaporize the cyclohexane and preheat the other reactants after which they were introduced into the reactor at rates of approximately 400 ml. per min., 400–500 ml. per min., and 1120 ml. per min., respectively. In the reactor, the gases were contacted with the fluidized catalyst (~150 ml.) maintained at a temperature of 440° C.–450° C. As the reactants were introduced, the flow of nitrogen was proportionately reduced so that the velocity of the entering gaseous reactants helped to maintain the catalyst in a fluidized state. A total of about 30 ml. of cyclohexane was fed over a reaction period of about 20 min.

Effluent gases from the top of the reactor were passed through a separator filled with glass wool for removal of any entrained catalyst particles and thence into a series of Dry Ice traps and finally through a caustic scrubber for removal of unreacted hydrogen chloride. Off-gas from the scrubber was vented through a wet-test meter.

The liquid product recovered from the Dry Ice traps contained according to gas chromatographic analysis about 12% cyclohexene and only about 1.5% benzene with the remainder being essentially unreacted cyclohexane. The calculated yield of cyclohexene based on this analysis was 91%.

Variations in conditions from those given in the example may be made without departing from the scope of the invention. The reaction may be carried out by mixing the cyclohexane with hydrogen chloride and air or oxygen and passing the mixture in contact with the catalyst in a heated reaction chamber; or if desired, the mixture may be introduced into the reaction zone in three separate streams; or the air or oxygen may be introduced into a mixture of the cyclohexane and hydrogen chloride. Precaution should be taken to avoid allowing the cyclohexane and oxygen to reach reaction temperature in the absence of hydrogen chloride.

In the preferred embodiment of the invention, the catalyst is employed in the fluidized or pseudo liquid state. It is maintained in a fluid or suspended state by the gaseous reactants themselves or optionally, by the use of an additional inert gas introduced from an outside source. The use of a fixed bed operation, however, is not outside the scope of the invention.

The relative proportions of the reactants may vary considerably. Preferred proportions are those corresponding to the stoichiometric proportions required to effect monochlorination of the cyclohexane charged, that is, a 1:1:0.5 ratio of cyclohexane to hydrogen chloride to oxygen or 1:1:2.5 if air is used instead of oxygen. Since hydrogen chloride is not consumed in the reaction, only very small amounts, if any, of this reactant need be fed once the reaction has been initiated if provision is made for recycle of the hydrogen chloride. Excesses of the cyclohexane and air may be employed if desired without significantly affecting the reaction.

Contact time is not too critical and may vary from about 0.5 second to about 12 seconds.

Reaction temperature is a critical factor and the temperature must be maintained above about 400° C. to effect the reaction. Preferably, the temperature is maintained in the range from about 440° C. to 500° C. Although temperatures above 500° C. and up to 600° C. can be employed, some carbon begins to deposit on the catalyst at these higher temperatures.

Any of the rare earth chlorides such as cerium chloride, samarium chloride, neodymium chloride and the like or mixtures thereof supported on pumice can be employed as catalysts. These can be readily prepared by saturating pumice with a solution, aqueous or otherwise, of the rare earth chloride, filtering and drying the impregnated pumice. Further drying may be effected by means of a flow of nitrogen (or other inert gas), hydrogen chloride and/or air through the mass while it is being heated to reaction temperature after it has been charged to the reactor. The more active catalysts are those prepared from methanolic solutions of the rare earth chlorides. Better catalytic activity has also been observed for catalysts prepared and dried under vacuum. Some carbonization of the catalyst occurs during the reaction but the catalyst can be readily reactivated or regenerated by heating with air at a temperature of about 500° C. to "burn off" any deposited carbon from its surface.

What is claimed is:

1. A process for the production of cyclohexene which comprises reacting cyclohexane with hydrogen chloride and oxygen in the presence of a catalyst consisting of a rare earth chloride supported upon pumice at a temperature above about 400° C.

2. A process for the production of cyclohexene which comprises reacting cyclohexane with hydrogen chloride and oxygen in the presence of a catalyst consisting of cerium chloride supported upon pumice at a temperature above 400° C.

3. A process for the production of cyclohexene which comprises reacting cyclohexane with hydrogen chloride and oxygen at a temperature in the range from about 440° C. to about 500° C. in the presence of a catalyst consisting essentially of cerium chloride supported upon pumice.

4. A process for the production of cyclohexene which comprises reacting cyclohexane with hydrogen chloride and oxygen in the molecular ratio of 1:1:0.5 at a temperature in the range from about 440° C. to about 500° C. in the presence of a catalyst consisting essentially of cerium chloride supported upon pumice.

References Cited in the file of this patent

UNITED STATES PATENTS

| | | |
|---|---|---|
| 2,183,574 | Levine et al. | Dec. 19, 1939 |
| 2,271,056 | Balcar | Jan. 27, 1942 |
| 2,308,489 | Cass | Jan. 19, 1943 |
| 2,395,314 | Blumer | Feb. 19, 1946 |

FOREIGN PATENTS

| | | |
|---|---|---|
| 180,421 | Austria | Dec. 27, 1927 |

OTHER REFERENCES

Huntress: Organic Chlorine Compounds, John Wiley & Sons, Inc., 1948, page 1104 relied upon.

UNITED STATES PATENT OFFICE
CERTIFICATE OF CORRECTION

Patent No. 3,108,144                      October 22, 1963

Ralph C. Tallman

It is hereby certified that error appears in the above numbered patent requiring correction and that the said Letters Patent should read as corrected below.

Column 1, line 31, for "convertion" read -- conversion --; column 4, line 24, for "180,421" read -- 108,421 --.

Signed and sealed this 28th day of April 1964.

(SEAL)
Attest:
ERNEST W. SWIDER

Attesting Officer

EDWARD J. BRENNER
Commissioner of Patents